United States Patent

[11] 3,599,349

[72] Inventor Donald E. Albright
Hugo, Minn.
[21] Appl. No. 829,357
[22] Filed June 2, 1969
[45] Patented Aug. 17, 1971
[73] Assignee Minnesota Mining & Manufacturing Company
St. Paul, Minn.

[54] TEST ANALYZER
6 Claims, 5 Drawing Figs.

[52] U.S. Cl. .......... 35/48
[51] Int. Cl. .......... G09b 7/06
[50] Field of Search .......... 35/48.2; 307/293

[56] References Cited

UNITED STATES PATENTS

| | | | |
|---|---|---|---|
| 3,216,132 | 11/1965 | Flaherty et al. | 35/48 |
| 3,284,929 | 11/1966 | Azure | 35/48 |
| 3,412,484 | 11/1968 | Evans et al. | 35/48 |
| 3,445,942 | 5/1969 | Azure | 35/48 |
| 3,487,561 | 1/1970 | Azure et al. | 35/48 |

OTHER REFERENCES

General Electric, Application Note 90.70 11/67 " The Diet-A Programmable Unijunction Transistor" by W. R. Spofford Jr. Syracuse, New York 307— 293

*Primary Examiner*—Robert W. Michell
*Assistant Examiner*—J. H. Wolff
*Attorney*—Kinney, Alexander, Sell, Steldt & Delahunt

ABSTRACT: A test analyzer for use in a test-grading device, wherein in response to the sensing of answer indications in the corresponding answer indication areas of an answer sheet and an answer key, a binary comparison signal is provided by means of "exclusive or" logic for each answer indication area indicating whether the student's answer indication agrees or disagrees with the answer indication in the corresponding answer indication areas of the answer key. In a preferred embodiment, an OR logic circuit which is operatively responsive to the binary comparison signals provides an error signal for actuating a scoring device for each question in which such a disagreement is sensed. The answer indication sensing means each include a programmable unijunction transistor (PUT) having its gate lead connected to a voltage dividing network which includes an answer indication sensor in order to provide and retain at its cathode lead a binary sensing signal having the reference voltage provided at the PUT anode lead.

INVENTOR.
DONALD E. ALBRIGHT
BY Kinney, Alexander, Sell, Steldt & De La Hunt
ATTORNEYS INVENTOR.
DONALD E. ALBRIGHT
BY Kinney, Alexander,
Sell, Steldt & DeLaHunt
ATTORNEYS

TEST ANALYZER

CROSS REFERENCE TO RELATED APPLICATION

This application is related to the copending application filed by John L. Roche on Feb. 10, 1969, Ser. No. 798,016.

BACKGROUND OF THE INVENTION

This invention pertains to an analyzer for a test-grading device used in scoring multiple choice-type questions.

Test analyzers in common necessarily provide for sensing the answer indications from the student's answer sheet and for sensing indications of the correct answers from an answer key. A comparison response based upon a comparison of the indications sensed from corresponding areas of the answer sheet and the answer key is routed through a scoring circuit to provide a scoring response for actuating a scoring device used to score the answer sheet.

It is desirable for a test analyzer to be cheatproof. Students should not be able to fool the test analyzer by placing indicia in a number of answer indication areas either in excess of or short of the correct number of answer indication areas to be indicated for each question.

Another desirable feature is that the test analyzer be able to cope with the type of multiple choice test wherein there may be provided a variable number of correct answers for each question (sometimes referred to as a "multiple-multiple-choice" test.)

It is in the nature of the scoring response provided by comparing the sensed combinations that test analyzers differ. Some provide a predetermined scoring response such as an error signal to every incorrectly answered question and others a predetermined scoring response such as a correct signal to every correctly answered question. More basically, the scoring responses provided by test analyzers may indicate the presence or absence of indicia in the answer indication areas of the answer sheet which correctly should contain indicia whereas other test analyzers provide scoring responses indicating the presence or absence of indicia in the answer indication areas of the answer sheet, which correctly should not contain indicia.

These test analyzers have limitations, however, and do not individually provide all of the aforementioned desirable features. For example, the "multiple-multiple-choice" test presents additional comparison response requirements. When only one answer indication area should contain an indicium, a scoring response can be derived by simply sensing whether the answer sheet contains an indicium in the answer indication area corresponding to the correct answer for each question, or by alternatively sensing whether any indicia have been placed in any answer indication areas not corresponding to the correct answer. Where there are a variable number of possible correct answers, a scoring response indicating whether the answer sheet contains an indicium in answer indication areas corresponding to the correct answers may be misleading when the student has placed indicia in a plurality of answer indication areas including all of the areas corresponding to correct answers, but also in excess thereof, especially when it is desired in scoring the test to give the student credit for each correct answer indication whether his answer indication be the placing of an indicium on the paper or intentionally not placing an indicium on the paper. Likewise, a scoring response indicating whether indicia have been placed in answer indication areas not corresponding to correct answers may be misleading when the indicia placed on the answer sheet by the student are correct but he in fact leaves blank some indication areas which should be marked.

SUMMARY OF THE INVENTION

In order to both be cheatproof and to be useful in grading multiple-multiple-choice-type questions the test analyzer of the present invention provides a scoring response which is based upon separate comparisons of the answer indications in each pair of corresponding answer indication areas for each question.

In the test analyzer of the present invention, binary sensing signals are provided upon scanning the corresponding answer indication areas of the answer sheet and the answer key, and in response to a comparison thereof, in accordance with "exclusive OR" logic, binary comparison signals are provided indicating whether there is agreement or disagreement between the answers indicated in each corresponding pair of answer indication areas.

In one preferred embodiment of the test analyzer, the binary comparison signals are routed through a scoring circuit comprising an OR logic circuit in order to provide a predetermined scoring response such as an error signal for each question to which there is at least one answer indication disagreement. In another preferred embodiment, an error signal is provided in response to each answer indication disagreement by routing the binary comparison signals separately through the scoring circuit to scoring devices.

In the test analyzer of the present invention, programmable unijunction transistors are connected to respond to the sensors of answer indications in order to provide and retain the binary sensing signals, thereby allowing the actuation of a scoring device to be delayed for each question until after the answer indication areas for the question are completely scanned. This improves reliability, notwithstanding the fact that the answer indication areas are not always uniformly aligned on all answer sheets, that answer sheets are not always uniformly aligned in a test grading device, that test grading devices are constructed to within mechanical tolerances, and that the indicia placed by the students within the answer indication areas are not of uniform intensity, size or position.

DESCRIPTION OF THE PREFERRED EMBODIMENT

In its preferred embodiment, the test analyzer of the present invention is adapted for use in grading the type of answer sheet wherein the student answers the questions by darkening selected answer indication areas of this answer sheet. The functional cooperation between the components of the test analyzer is described with reference to FIGS. 1 and 2.

Figure 3:
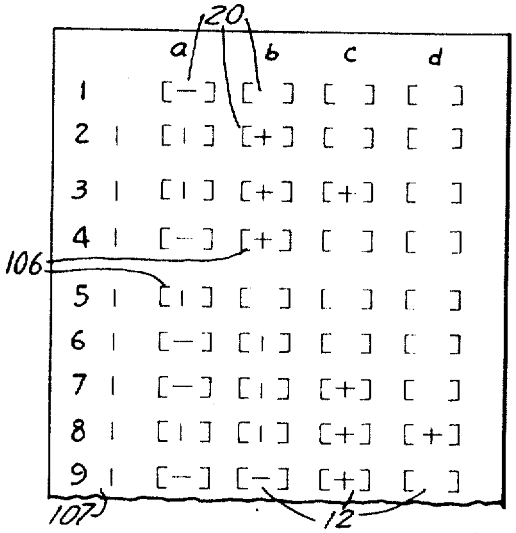
FIG. 3 is an illustration of an answer sheet used with the test analyzer of FIG. 2.

The answer sheet sensing means 10 include sensors, such as photocells 11 or phototransistors, which sense the amount of light reflected from the answer indication areas 12 of the answer sheet FIG. 3). The answer sheet sensing means 10 provide binary sensing signals on lines 13 indicating whether each answer indication area 12 is darkened or undarkened.

The answer key sensing means 14 provide binary-sensing signals on lines 15 in response to the amount of light reflected from the answer indication areas 16 of an answer key (FIG. 4) having answer indication areas 16 corresponding to the answer indication areas 12 of the answer sheets. The binary-sensing signals on line 15 also indicate whether the answer indication areas 16 are darkened or undarkened. Such an answer key would be programmed by the teacher darkening selected answer indication areas as shown by the horizontal lines in various answer indication areas 16.

In other embodiments, the test analyzer includes sensing means which respond to other types of answer indications such as the presence or absence of magnetic or electrically conductive material, of mechanical detents, or of holes in the answer indication areas. Also, in other embodiments, sensing may be in response to the intensity of the light transmitted through, rather than to the intensity of the light reflected from the answer indication areas.

The comparison means 18, which operate in accordance with "exclusive OR" logic, provide binary comparison signals on lines 19 indicating whether the binary-sensing signals received on lines 13 and 15 are in agreement or disagreement. In one preferred embodiment, a binary 0 signal on line 19 indicates agreement between the signals on lines 13 and 15, and a binary 1 signal on a line 19 indicates a disagreement between the binary-sensing signals on a corresponding pair of lines 13 and 15.

In this embodiment, a binary 1 signal on a line 13 or 15 indicates that a darkened area as shown by horizontal lines in various ones of the answer indication areas 20 or 17 of the answer sheet or answer key has been sensed. A binary 1 signal, once impressed on lines 13 or 15, is retained until the sensing means 10 and 14 receive a reset signal on line 21. The reset signal is a zero voltage signal, although in other embodiments it could be of some finite voltage depending upon the particular circuit configuration of the sensing means 10 and 14.

The output lines 19 of the comparing means 18 are connected to a scoring circuit 22. A scoring response such as a scoring signal is provided from scoring circuit 22 on line 23. The predetermined nature of the scoring signal on line 23 is dependent upon the manner of connection of the lines 19 within the scoring circuit 22.

In the preferred embodiment the lines 19 are interconnected with each other in order to provide on output line 23 a scoring signal which is in response to the sensing of all of the corresponding pairs of answer indication areas 12 and 16 for a question.

Scoring circuit 22 interconnects the lines 19 in accordance with OR logic whereby the occurrence of a binary 1 signal on any of the lines 19 produces a binary 1 signal on the line 23. Thus, in this embodiment, the predetermined scoring signal corresponding to a binary 1 signal on line 23 is an error signal indicative of at least one disagreement between answer indications in corresponding pairs of answer indication areas 12 and 16 for each question.

Figure 4:
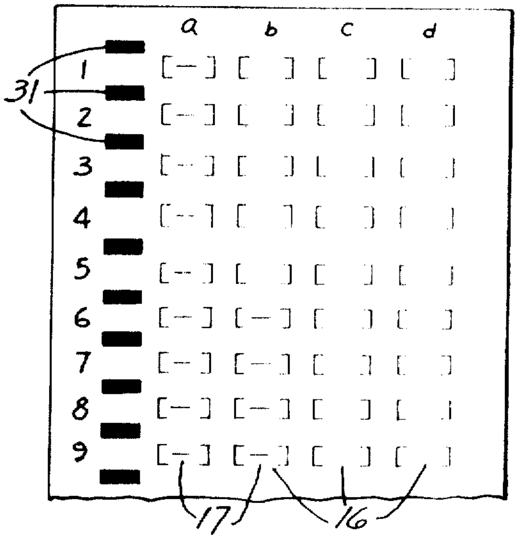
FIG. 4 is an answer key which may be graded by using the test analyzer of FIG. 2.

The scoring device 24, such as a pen for marking the answer sheet, or a counter for recording the number of questions for which an error signal is produced, is enabled in response to an enabling signal such as a binary 0 signal on line 25 from an enabling means such as a NAND gate 26. One input of the NAND gate 26 is connected to line 23 from the scoring circuit 22. The other input to NAND gate 26 is received on the line 27 from a strobe mark sensing means 28. The strobe mark sensing means 28 delivers and holds a binary 1 signal to the NAND gate 26 on the line 27 and to the resetting means 29 on the line 30 whenever the strobe mark sensing means 28 senses a strobe mark, such as a strobe mark 31 positioned on the answer key (FIG. 4). At the conclusion of the binary 1 signal from the strobe mark sensing means 28, the resetting means 29 delivers a reset signal on line 21.

The strobe marks 31 are placed on the answer key so that they are sensed by photocell 32 only during such times as the answer indication areas 16 are not being sensed by the photocells 33. In this manner, it is assured that the enabling of the scoring device 24 is delayed until such time as the answer indication areas 12 and 16 of the answer sheet and answer key are completely scanned, thus making less critical the size, the intensity and the precise location of the darkened indications placed by the student or the teacher within the respective answer indication areas 12 and 16. When the photocell 32 passes beyond each strobe mark 31, a resetting signal is delivered on line 21 to reset the sensing means 10 and 14 so as to again provide a binary 0 signal on both lines 13 and 15 of the answer indication areas 12 and 16 for each succeeding question so that the sensing means 10 and 14 may be reset before scanning the answer indication areas 12 and 16 of each succeeding question.

Figure 2:
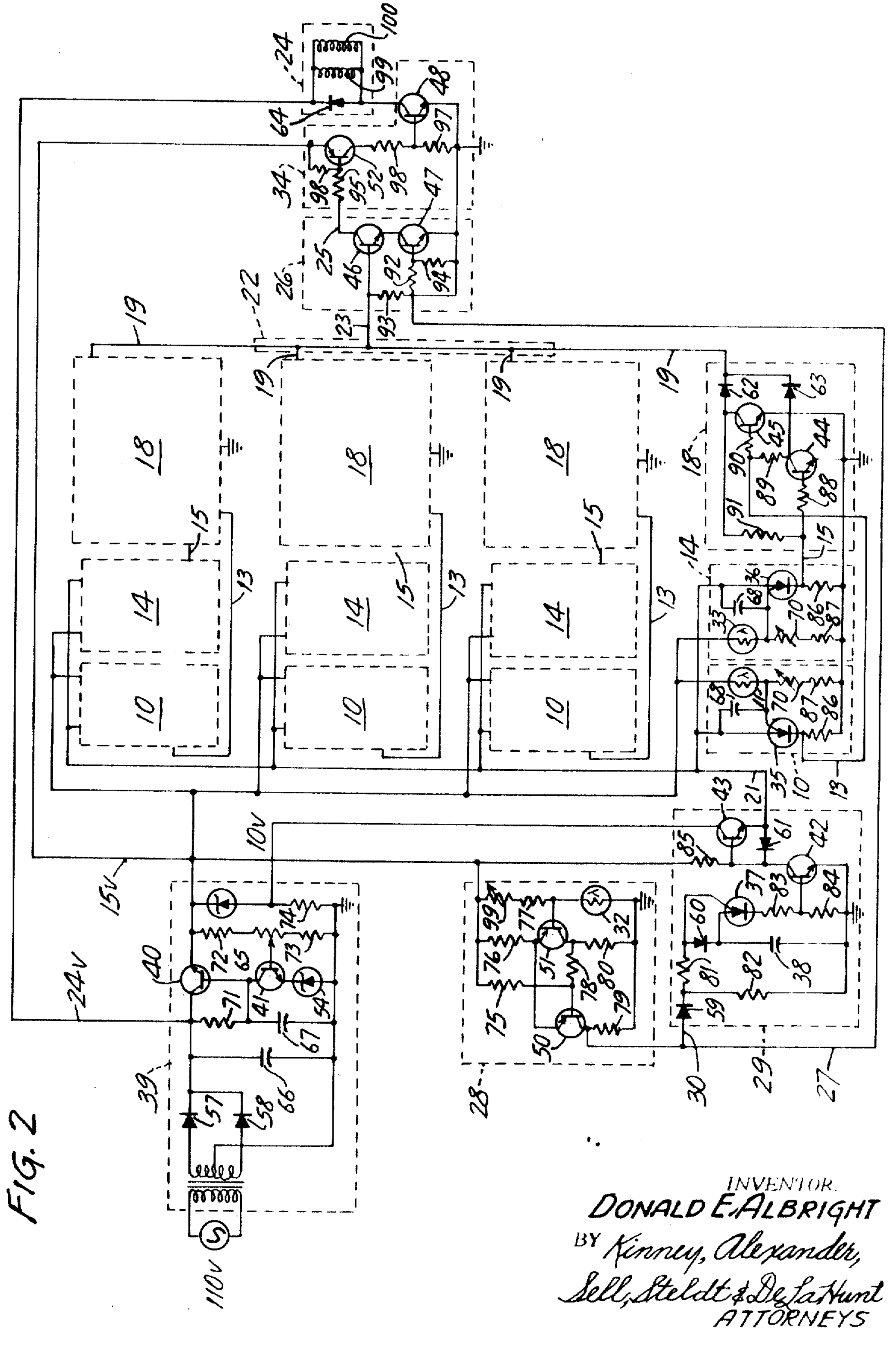
FIG. 2 is a schematic diagram of an electrical circuit corresponding to the logic diagram of FIG. 1.

Referring to the answer sheet sensing means 10 and the answer key sensing means 14 as shown in FIG. 2, the photocells 11 and 33 respectively become relatively nonconductive upon sensing a darkened area. The photocells 11 and 33 are a part of adjustable voltage-dividing networks respectively connected to the gate leads of programmable unijunction transistors 35 and 36. Therefore, upon photocell 11 or 33 sensing a darkened area, the voltage level at the gate of PUT (programmable unijunction transistor) 35 or 36 respectively decreases to a level sufficiently less than the respective PUT anode potential and turns on the respective PUT 35 or 36 and produces a binary 1 signal at the cathode of PUT 35 or 36 respectively.

By including programmable unijunction transistors, which are generally temperature stable but very sensitive threshold-sensing devices, in combination with the voltage-dividing network, the sensing means can be adjusted to provide and retain at the PUT cathode lead binary 1 sensing signals in response to sensing an amount of light below a minimum reference level of light, such as when sensing a nonreflective or darkened area. The reference voltage of the binary 1 sensing signal is the voltage provided at the anode lead of the PUT. By adjusting the voltage-dividing network to set this threshold level, the sensing means are made to provide a binary 1 signal in response to sensing answer indications and strobe marks such as are made by a black lead pencil but not in response to sensing the brackets or question numbers which are printed on the answer sheet and answer key with an ink having greater reflective properties. The combination of the PUT and the voltage dividing network also provide compensation for the variations in the light-versus-resistance characteristics of the photocells and in the light output characteristics of the sources of the reflected light. This combination of a PUT and a voltage-dividing network is also useful in providing and maintaining a binary signal in response to a change beyond a threshold of analog signals indicating other sensed conditions than light intensity. A binary 1 signal is retained on the lines 13 or 15 respectively until a zero voltage resetting signal is received by the sensing means 10 and 14 on line 21 from the resetting means 29. The resetting signal from line 21 is applied to the anodes of PUTs 35 or 36 thereby reducing the voltage at the anodes of PUTs 35 and 36 to ground potential and terminating their conduction, if any, which conduction, if any, had been maintained since the origin of such conduction in response to the sensing of a darkened area by photocell 11 or 33 respectively.

The resetting means 29 delivers a resetting signal on line 21 to sensing means 10 and 14 upon the removal of the binary 1 strobe signal from line 30. The strobe signal is a positive voltage signal which places the same voltage bias on both the gate and anode of PUT 37 of resetting means 29. Upon receipt of a zero voltage signal at the conclusion of the strobe signal on line 30, the voltage at the gate of PUT 37 returns immediately to zero, but the voltage at the anode is maintained until discharged through capacitor 38, thereby causing PUT 37 to deliver a short signal pulse which in turn causes the resetting means 29 to deliver a zero voltage resetting signal on line 21 to the anodes of PUTs 35 and 36 of the sensing means 10 and 14.

Referring to the circuit diagram of FIG. 2, the DC voltage levels necessary for operation of the circuit are supplied by circuit 39 which is shown connected to a 110 volt source of AC power.

The identification or value of the circuit elements for one embodiment of the circuit shown in FIG. 2 are:

| *Photocells* | | Rectifiers | | Resistors | |
|---|---|---|---|---|---|
| 11 | CL905HL | 57 | IN4003 | 71 | 390 Ω |
| 32 | CL905HL | 58 | IN4003 | 72 | 760 Ω |
| 33 | CL905HL | 59 | DHD806 | 73 | 2.7 KΩ |
| *PUTs* | | 60 | DHD806 | 74 | 470 Ω |

Table - Continued

| Photocells | | Rectifiers | | Resistors | |
|---|---|---|---|---|---|
| 35 | D13T1 | 61 | DHD806 | 75 | 2.2 KΩ |
| 36 | D13T1 | 62 | DHD806 | 76 | 680 Ω |
| 37 | D13T1 | 63 | DHD806 | 77 | 4.7 KΩ |
| *NPN Transistors* | | 64 | 1N4003 | 78 | 2.2 KΩ |
| 40 | 2N4921 | *Potentiometers* | | 79 | 2.7 KΩ |
| 41 | 2N5172 | 65 | 1 KΩ | 80 | 2.2 KΩ |
| 42 | 2N5172 | *Capacitors* | | 81 | 1 KΩ |
| 43 | 2N4400 | 38 | 0.1 μf | 82 | 100 KΩ |
| 44 | 2N5172 | 66 | 1,000 μf | 83 | 220 Ω |
| 45 | 2N5172 | 67 | 0.1 μf | 84 | 1.5 KΩ |
| 46 | 2N5172 | 68 | 0.022 μf | 85 | 1 KΩ |
| 47 | 2N5172 | *Variable Resistors* | | 86 | 2.2 KΩ |
| 48 | 2N4921 | 69 | 50 KΩ | 87 | 33 KΩ |
| *PNP Transistors* | | 70 | 200 KΩ | 88 | 15 KΩ |
| 50 | 2N4125 | | | 89 | 5.6 KΩ |
| 51 | 2N4125 | | | 90 | 15 KΩ |
| 52 | 2N4125 | | | 91 | 5.6 KΩ |
| *Zener Diodes* | | | | 92 | 5.6 KΩ |
| 54 | 1N4740 | | | 93 | 47 KΩ |
| 55 | 1N4732A | | | 94 | 47 KΩ |
| | | | | 95 | 1.5 KΩ |
| | | | | 96 | 560 Ω |
| | | | | 97 | 10 KΩ |
| | | | | 98 | 100 KΩ |

The bias voltage values shown in FIG. 2 are appropriate for the embodiment in which the foregoing circuit elements are used.

The scoring device 24 includes solenoid coils 99 and 100 for operating a marking pen and counter. Counter coil 99 is rated at 5 watts and marking pen coil 100 is rated at 1 watt.

Thus, when there is a disagreement between the answer indications in corresponding answer indications 12 and 16 of the answer sheet and answer key, a binary 1 signal is received on one of a corresponding pair of lines 13 and 15 and a binary 0 signal is received on the other, thereby producing a binary 1 signal on the corresponding line 19 from the corresponding comparing means 18 to the scoring circuit 22. The binary 1 signal accordingly provided on line 23 is retained until after the strobe mark sensing means 28 have provided a binary 1 signal on line 27. Simultaneous binary 1 signals on lines 23 and 27 to both inputs of the NAND gate 26 deliver a binary 0 enabling signal to the scoring device 24, which binary 0 signal serves to ground one side of the scoring device 24 in order to effectively actuate the scoring device 24. A current amplifier 34 is placed between the NAND gate 26 and the scoring device 24 because the current levels within the NAND gate are insufficient for switching a transistor, such as the transistor 48, having a sufficiently high current rating to conduct the current which flows through the scoring device 24, upon the latter being enabled.

Figure 5:
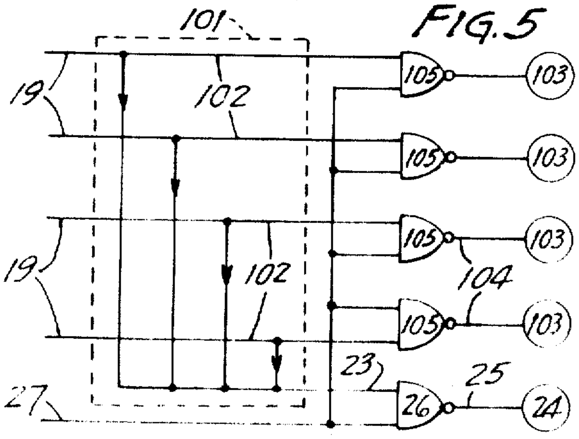
FIG. 5 is a block diagram of another embodiment of the scoring circuit, enabling means, and scoring device which may be used with the test analyzer shown in FIG. 1.

Another preferred embodiment of the scoring circuit is shown in FIG. 5. Therein, scoring circuit 101 provides separate error signals on lines 102 in response to each binary comparison signal on the lines 19 which indicate a disagreement between answer indications sensed in a corresponding pair of answer indication areas 12 and 16. Separate scoring devices 103 are provided to respond to each separate error signal on the lines 102. The respective scoring devices 103 are enabled in response to respective enabling signals on the lines 104 from the enabling means, such as NAND gates 105. NAND gates 105 provide the respective enabling signals on lines 104 upon the simultaneous receipt of an error signal on the respective lines 102 and of a strobe signal on line 27. In accordance with this embodiment, marking pens positioned for separately marking the separate answer indication areas 12 of an answer sheet are enabled for marking each of those answer indication areas 106 of the answer sheet in which a disagreement between the student's selected answer and a corresponding teacher's programmed answer is sensed.

The circuit configuration of scoring circuit 22 is also included within scoring circuit 101. In accordance with scoring circuit 22, the scoring device 24 is enabled for placing a mark in the question area 107 of the answer sheet for each question in which at least one disagreement between a student's selected answer indication and a corresponding teacher's programmed answer is sensed. In accordance with the circuit of FIG. 5, therefore, marks are placed both in the answer indication areas 106 and in the question area 107 of the answer sheet in response to sensed incorrect answer selections by the student.

Phototransistors may be substituted for the photocells to provide a faster response and a greater signal-to-noise ratio.

Figure 1:
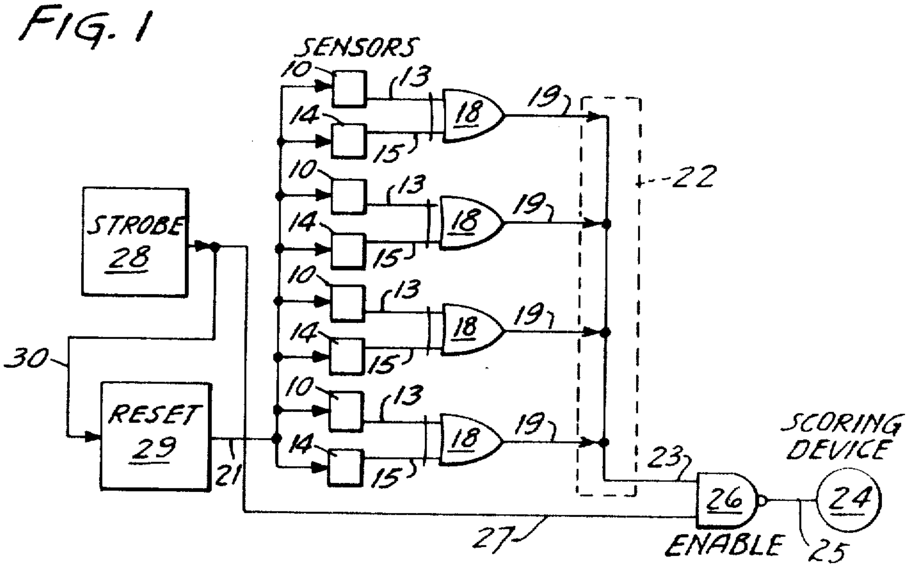
FIG. 1 is a logic diagram in block form of the test analyzer of the present invention.

While only four parallel pairs of sensing means 10 and 14 have been shown in FIGS. 1 and 2, it is to be understood that any number of sensing means pairs 10 and 14 could be used depending on the number of columns of possible choices on the answer sheet. Only two would be used if it were desired to grade only true/false questions, and by the same token, means for sensing five columns would be provided if it were desired to build a test-grading device which graded multiple choice questions having five possible answer indication areas.

The test analyzer of the present invention may be used with those means for scanning answer sheet and answer key answer indication areas in order to sense the answer indications therein, and with those means for placing marks on the answer sheet which are described in U.S. Pat. No. 3,412,484 to Evans or with those such means described in a pending U.S. Pat. application, Ser. No. 798,016, filed by John L. Roche on Feb. 10, 1969.

The capability of this test analyzer when used with such scanning and marking means is described with reference to FIGS. 3 and 4. The teacher programmed the answer key to indicate that for each question 1 through 5, only one answer indication area should be darkened by the student, to wit: *a*; and that for each of questions 6 through 9, two answer indication areas should be darkened by the student, to wit: *a* and *b*.

The student answered question 1 correctly and no marks were placed on the answer sheet in the line of question 1.

The student answered *b* for question 2. As a result, the marking pens marked areas *a* and *b* in which a disagreement was sensed in comparing the corresponding areas of the answer key and answer sheet and in the question area 107 since a disagreement between corresponding areas was sensed for the question.

In question 3, the student darkened areas *b* and *c*. Both were wrong, so the marking pens marked areas *a*, *b* and *c*, as well as in question area 107.

In question 4, the student darkened areas *a* and *b*. Since only his answer of *b* was wrong, only area *b* and question area 107 were marked by the marking pens.

In question 5, the student darkened no area. Therefore, only area *a* and question area 107 were marked by the marking pens.

In question 6, the student darkened *a* correctly but missed *b*. Therefore, scoring marks were placed on the answer sheet in area *b* and in question area 107.

In question 7, wherein the student correctly darkened *a* but incorrectly darkened *c* and not *b*, areas *b*, *c* and the answer area 107 were marked by the marking pens.

In question 8, the student marked *c* and *d* and the marking pens responded by marking each answer indication area *a*, *b*, *c* and *d* and question area 107.

In question 9, the student correctly answered both *a* and *b* but also darkened *c*. Marking pens marked area *c* and the question area 107.

From the foregoing, it is seen that the test analyzer of the present invention is cheatproof and that "multiple-multiple-choice" tests can be graded. The student could not fool it by darkening more or fewer answer indication areas than should have been darkened to indicate the correct answers. A scoring response is provided for each erroneous answer indication by the student. A scoring device places marks in the answer indication areas 106 so as to inform the student exactly what the correct answers should have been and for placing marks in the question area 107 to indicate which questions were incorrectly answered so that a person examining the answer sheet can more readily ascertain such information.

I claim:

1. In a test-grading device for scoring an answer sheet containing a plurality of answer indication areas for each question of the type containing a test analyzer wherein answer indications in corresponding answer indication areas of an answer sheet and an answer key are sensed by scanning the corresponding answer indication areas with sensing means to provide sensing signals which are compared by a comparing means to provide comparison signals which are routed through a scoring circuit to provide a scoring response for actuating a scoring device, an improved test analyzer comprising
  - answer sheet means for sensing answer indications in said scanned answer indication areas of said answer sheet, which answer sheet sensing means includes energy source means for providing a separate binary-sensing signal for each said scanned answer indication area of said answer sheet in response to each said sensed indication;
  - answer key sensing means for sensing answer indications in said scanned answer indication areas of said answer key, which answer key sensing means includes energy source means for providing a separate binary-sensing signal for each said scanned answer indication area of said answer key in response to each said sensed indication; and
  - comparing means operatively coupled to the answer sheet sensing means and to the answer key sensing means for comparing said binary-sensing signals provided by the answer sheet and answer key sensing means in response to the scanning of each separate corresponding pair of answer indication areas of a said answer sheet and a said answer key, which comparing means provides, for each separate corresponding pair of said scanned answer indication areas, separate binary comparison signals for enabling separate scoring responses for each separate corresponding pair of said scanned answer indication areas for each question by indicating either agreement or disagreement between said answer indications sensed in each separate corresponding pair of said scanned answer indication areas.

2. A test analyzer according to claim 1, further comprising a scoring circuit operatively coupled to the comparing means, which scoring circuit provides an error signal in response to each said separate binary comparison signal which indicates a disagreement between answer indications sensed in a said separate corresponding pair of said scanned answer indication areas.

3. A test analyzer according to claim 1, further comprising a scoring circuit operatively coupled to the comparing means, which scoring circuit provides for each question an error signal in response to at least one said separate binary comparison signal indicating disagreement between answer indications sensed in a said separate corresponding pair of said scanned answer indication areas of each question.

4. A test analyzer according to claim 1, comprising
  - a scoring circuit operatively coupled to the comparing means for providing a predetermined scoring response for each question in response to said binary comparison signals provided by the comparing means;
  - delaying means operatively coupled to the scoring circuit for delaying each actuation of a said scoring device until after the completion of scanning of each said corresponding pair of answer indication areas to which the scoring device is responding, wherein the delaying means include
  - strobe mark sensing means for sensing strobe marks positioned in relation to the answer indication areas of the answer sheet and answer key and in relation to the strobe mark sensing means to be sensed by the strobe mark sensing means while the answer indication areas are not being scanned by the scanning means, which strobe mark sensing means provide a strobe signal in response to and during the sensing of a strobe mark; and
  - enabling means operatively coupled to the scoring circuit and to the strobe mark sensing means for enabling a said scoring device in response to a predetermined scoring response provided by the scoring circuit and in response to a said strobe signal provided by the strobe mark sensing means.

5. A test analyzer according to claim 4, wherein each answer sheet sensing means and each answer key sensing means each separately includes a maintaining means for maintaining a said binary-sensing signal until a time during the sensing of the next strobe mark, which maintaining means includes
  - means for providing a first given binary sensing signal until sensing an answer indication mark and for providing a second given binary sensing signal upon sensing a said answer indication mark until reset to again provide a first given binary sensing signal;

and which test analyzer further comprises
  - resetting means operatively coupled to the strobe mark sensing means and to the answer sheet and answer key sensing means for resetting the maintaining means of the answer sheet and answer key sensing means in response to the end of a said strobe signal provided by the strobe mark sensing means 6. A test analyzer according to claim 5, wherein each answer key sensing means and each answer sheet sensing means each separately comprises
  - a voltage-dividing network including a light sensitive variable resistive device;
  - a first programmable unijunction transistor having its gate lead connected to the voltage-dividing network; and
  - a lead connected to the cathode of the first programmable unijunction transistor for containing a said binary-sensing signal; and wherein the resetting means comprises
  - a second programmable unijunction transistor having its gate lead and lead anode operatively and separately connected to the strobe mark sensing means to receive a said strobe signal,
  - a rectifier connected across the gate and anode leads of the second programmable unijunction transistor and operatively connected between the anode lead and the strobe mark sensing means for establishing a potential difference between said gate and anode leads, for preventing current flow from said anode lead to said gate lead, and for inhibiting the actuation of the second programmable unijunction transistor until after said strobe signal is removed therefrom,
  - a capacitor connected in parallel with the anode and cathode leads of the second programmable unijunction transistor for enabling a signal pulse to be provided from the second programmable unijunction transistor in response to the end of the strobe signal, and
  - means operatively connected between the cathode of the second programmable unijunction transistor and the anodes of each of the first programmable unijunction transistors for turning off the first programmable unijunction transistors in response to said signal pulse from the second programmable unijunction transistor.

UNITED STATES PATENT OFFICE
CERTIFICATE OF CORRECTION

Patent No. 3,599,349 Dated August 17, 1971

Inventor(s) Donald E. Albright

It is certified that error appears in the above-identified patent and that said Letters Patent are hereby corrected as shown below:

Column 1, line 67, before "indicia" insert -- only --.

Column 2, line 54, change "this" to --his--.

Column 3, line 14, after "the" insert -- signals on lines 13 and 15. This binary 1 signal is held on a line 19 only so long as there is a disagreement between the --.

Column 7, line 12, after "sheet" insert -- sensing --; and line 54, after "1," insert -- further --.

Signed and sealed this 9th day of May 1972.

(SEAL)
Attest:

EDWARD M.FLETCHER,JR.
Attesting Officer

ROBERT GOTTSCHALK
Commissioner of Patents

PO-1050 (10-69)

USCOMM-DC 60376-P69
☆ U.S. GOVERNMENT PRINTING OFFICE : 1969 O—366-334